United States Patent [19]
Hirose

[11] Patent Number: 5,746,138
[45] Date of Patent: May 5, 1998

[54] MULTI-DEGREE-OF-FREEDOM POSITIONING MECHANISM

[75] Inventor: Kazuya Hirose, Tokyo, Japan

[73] Assignee: Hihaisuto Seiko Co., Ltd., Tokyo, Japan

[21] Appl. No.: 681,994

[22] Filed: Jul. 30, 1996

[30] Foreign Application Priority Data

Jul. 31, 1995 [JP] Japan ................. 7-195266

[51] Int. Cl.$^6$ ............................................. A47B 9/00
[52] U.S. Cl. ........................ 108/145; 254/126; 108/143
[58] Field of Search ............................ 108/145, 147, 108/144, 143; 254/122, 126; 248/421

[56] References Cited

U.S. PATENT DOCUMENTS

| | | | |
|---|---|---|---|
| 451,006 | 4/1891 | Singer | 108/145 X |
| 2,624,535 | 1/1953 | Bollhoefer | 108/145 X |
| 3,277,501 | 10/1966 | Friz et al. | 108/145 X |
| 3,917,211 | 11/1975 | Daunderer et al. | 108/145 X |
| 4,607,578 | 8/1986 | Inoue et al. | 108/145 |
| 4,744,712 | 5/1988 | Mitchell | 108/145 X |
| 5,311,791 | 5/1994 | Yanagisawa | 108/143 X |
| 5,339,749 | 8/1994 | Hirose | 108/143 |

*Primary Examiner*—Jose V. Chen
*Attorney, Agent, or Firm*—Townsend & Banta

[57] ABSTRACT

There is provided a multi-degree-of-freedom positioning mechanism having a guide shaft and first and second moving members movably mounted on the guide shaft. Each drive is connected with the first and second moving members so as to allow the moving members to travel along the guide shaft. The machanism has a pair of foldably joined equally long links, which are pivotally rotatably engaged with the first and second moving members by first and second couplings. Furthermore, one edge of a table is pivotally rotatably engaged with the joint between the mating links of the foldably joined equally long links, to displaceably support the table.

7 Claims, 13 Drawing Sheets

DEGREE OF FIXED
FREEDOM:  0   1   2   3

ROTATABLE STATE   ROTATION-ARRESTED
                       STATE

MULTI-DEGREE-OF-FREEDOM POSITIONING MECHANISM

[DETAILED DESCRIPTION OF THE INVENTION]

[0001]

[INDUSTRIAL FIELD OF APPLICATION]

The present invention relates to a multi-degree-of-freedom positioning mechanism which can be applied to precision measuring instruments, precision machine tools, precision assembling apparatuses, etc.

[0002]

[PRIOR ART]

In the past, machine tools and manipulators of robots had been designed on a ready-made idea that a cantilever structure was the best.

However, in recent years, a structure to destroy the ready-made idea begins to be marketed as products. The structure is called a parallel mechanism, and has a plurality of links connected in parallel between an end effector (called a table in this specification) and a base. These links are either of telescopic type or of folding type.

This structure is generally said to provide high precision, high rigidity and high speed, compared to the previous cantilever structure (see Nikkei Mechanical).

[0003]

[PROBLEMS TO BE SOLVED BY THE INVENTION]

However, on the other hand, the calculation of table position and attitude control is complicated, to make the software complicated and expensive. In addition, telescopic type links are narrow in traveling range, and folding type links have problems In view of precision and dynamics.

The present invention is proposed to overcome these disadvantages. The object of the present invention is to provide a multi-degree-of-freedom positioning mechanism simplified in mechanism, larger in traveling range and easy in attitude control.

[0004]

[MEANS FOR SOLVING THE PROBLEMS]

To solve the above problem, the multi-degree-of-freedom positioning mechanism of the present invention can comprise at least a guide shaft and first and second moving members movably mounted on the guide shaft; one each drive, being connected with the first and second moving members, to allow the first and second moving members to travel on the guide shaft individually; the ends of a pair of foldably joined equally long links, being pivotally rotatably engaged with the first and second moving members, through first and second couplings; and one edge of a table, being pivotally rotatably engaged with the joint between the mating links of the pair, to displaceably support the table.

Furthermore, the multi-degree-of-freedom positioning mechanism of the present invention can comprise first and second guide shafts and first and second moving members movably mounted on each of the first and second guide shafts; one each drive, being connected with the respective first and second moving members, to allow the respective first and second moving members to travel on the first and second guide shafts individually; the ends of two pairs of foldably joined equally long links, being pivotally rotatably engaged with the respective first and second moving members, through respective first and second couplings; and two opposite edges of a table, being pivotally rotatably engaged with the two joints between the mating links of the respective pairs, to displaceably support the table.

In the above configuration of the present invention, each of the second couplings can be provided with a rotation arrester in which an arbor is rotatably mounted in a bracket provided on the second moving member, with both the ends of the arbor protruding from the bracket, and has its one end rotatably engaged with the end of the link, to prevent the rotation of the arbor around itself.

Still furthermore, the multi-degree-of-freedom positioning mechanism of the present invention can comprise first and second guide shafts and first and second moving members movably mounted on each of the first and second guide shafts; one each drive, being connected with the respective first and second moving members, to allow the respective first and second moving members to travel on the first and second guide shafts individually; the ends, on one side, of two pairs of equally long links mutually pivotally rotatably connected in cross at their intermediate points, being engaged with the respective first and second moving members, through respective first and second couplings; the ends, on the other side, of said two pairs of links, being pivotally rotatably engaged with the ends of a respectively corresponding pair of foldably joined equally long links; and two opposite edges of a table, being pivotally rotatably engaged with the two joints between the mating links of the respective pairs, to displaceably support the table.

In the above configuration of the present invention, each of the second couplings can be provided with a rotation arrester in which an arbor is rotatably mounted in a bracket provided on the second moving member, with both the ends of the arbor protruding from the: bracket, and has its one end rotatably engaged with the end of the link, to prevent the rotation of the arbor around itself.

Still furthermore, the multi-degree-of-freedom positioning mechanism of the present invention can comprise first, second and third guide shafts and first and second moving members movably mounted on each of the first, second and third guide shafts; one each drive, being connected with the respective first and second moving members, to allow the respective first and second moving members to travel on the first, second and third guide shafts individually; the ends of three pairs of foldably joined equally long links, being pivotally rotatably engaged with the respective first and second moving members, through respective first and second couplings; and three edges of a table, being pivotally rotatably engaged with the three joints between the mating links of the respective pairs, to displaceably support the table.

In the above configuration of the present invention, each of the second couplings can be provided with a rotation arrester in which an arbor is rotatably mounted in a bracket provided an the second moving member, with both the ends of the arbor protruding from the bracket, and has its one end rotatably engaged with the end of the link, to prevent the rotation of the arbor around itself.

Still furthermore, the multi-degree-of-freedom positioning mechanism of the present invention can comprise first, second and third guide shafts and first and second moving members movably mounted on each of the first, second and third guide shafts; one each drive, being connected with the respective first and second moving members, to allow the respective first and second moving members to travel on the first, second and third guide shafts individually; the ends, on one side, of three pairs of equally long links mutually pivotally rotatably connected in cross at their intermediate points, being engaged with the respective first and second moving members, through respective first and second couplings; the ends, on the other side, of said three pairs of links, being pivotally rotatably engaged with the ends of a respectively corresponding pair of foldably joined equally long links; and three edges of a table, being pivotally rotatably engaged with the three joints between the mating links of the respective pairs, to displaceably support the table.

In the above configuration of the present invention, each of the second couplings can be provided with a rotation arrester in which an arbor is rotatably mounted in a bracket provided on the second moving member, with both the ends of the arbor protruding from the bracket, and has its one end rotatably engaged with the end of the link, to prevent the rotation of the arbor around itself.
[0005]

[ACTION]

Since the positions of the two joints between the mating links of the two pairs can be easily detected from the positions of the respective first and second moving members on the first and second guide shafts, table position and attitude control can be easily calculated.

Furthermore, when a pair of links and the table are located to form a straight line (dead point), stopping the pivotal rotation of the pair of links around its guide shaft and operating another pair of links allow the table to progress from the dead point in a desired direction. Therefore, the traveling range of the table increases by that.

Moreover, if the table is pivotally rotatably supported by three pairs of links engaged with the respective moving members on the first, second and third guide shafts, furthermore delicate table attitude control can be carried out.

If pairs of equally long links mutually pivotally rotatably connected in cross at their intermediate points and pairs of foldably joined equally long links are used to support the table, the displaceable range of the table can be further expanded.
[0006]

[EXAMPLES]

The multi-degree-of-freedom positioning mechanism of the present invention is described below based on the attached drawings.

Figure 1:
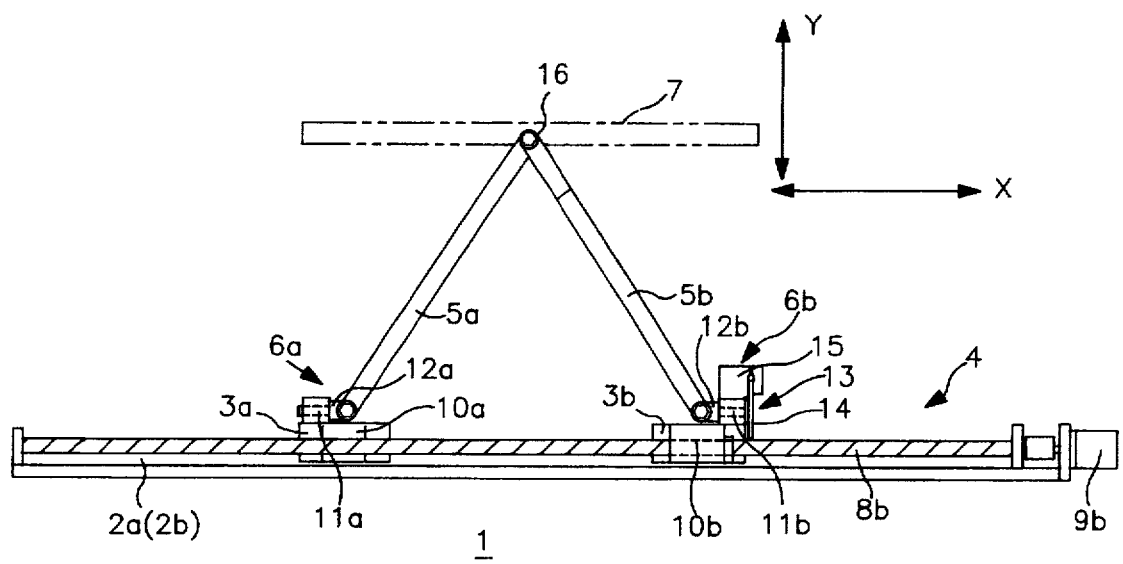
[FIG. 1] A typical side illustration showing the multi-degree-of-freedom positioning mechanism of the present invention as an example.
Figure 2:
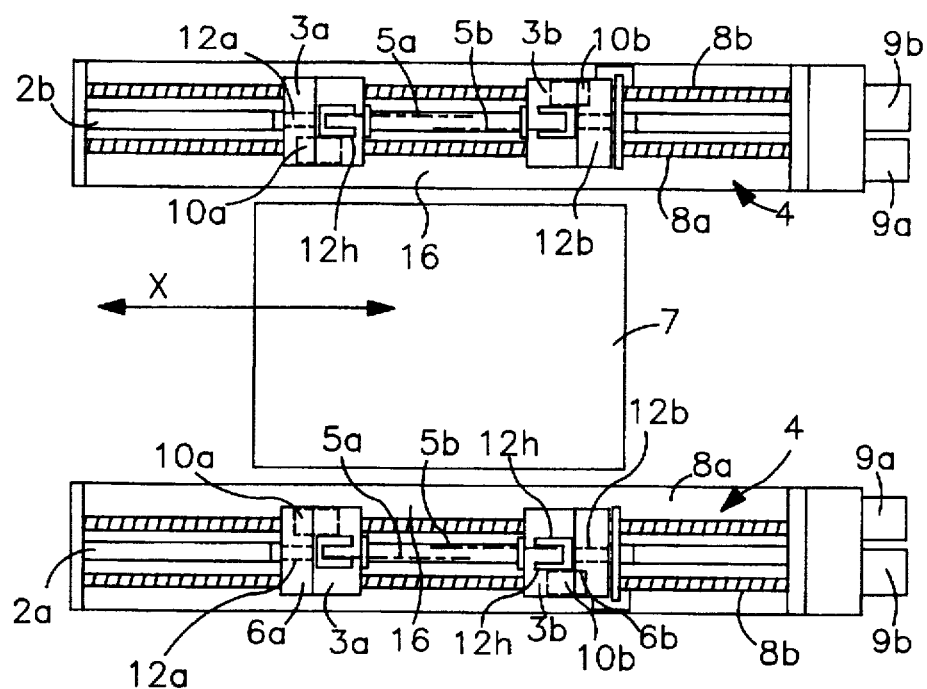
[FIG. 2] A plan illustration of the multi-degree-of-freedom positioning mechanism shown in FIG. 1.
Figure 6:
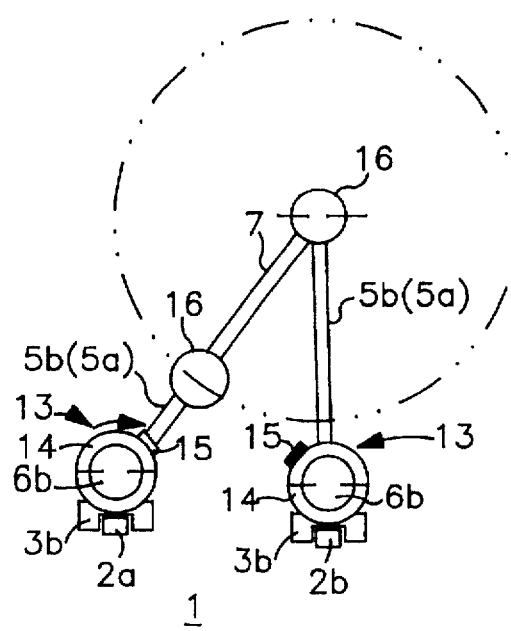
[FIG. 6] A typical side illustration showing an action of the multi-degree-of-freedom positioning mechanism shown in FIG. 1.

FIGS. 1, 2 and 6 show the basic configuration of an example embodying the first type of the multi-degree-of-freedom positioning mechanism 1 of the present invention. The multi-degree-of-freedom positioning mechanism 1 is composed of first and second guide shafts 2a and 2b parallel to each other, first and second sliding members 3a and 3b slidably mounted on each of the first and second guide shafts 2a and 2b, and drives 4 connected with the respective first and second sliding members 3a and 3b. In this configuration, the drives 4 are selectively controlled to allow the respective first and second sliding members 3a and 3b to properly slide on the first and second guide shafts 2a and 2b. The configuration and selective control actions of the drives will be described later.

The respective first and second sliding members 3a and 3b on both the first and second guide shafts 2a and 2b are engaged with the ends of one each pair of foldably joined equally long links 5a and 5b, respectively through first and second couplings 6a and 6b, in order that the pairs of links can pivotally rotate in the direction along the first guide shaft 2a and in the direction to cross the first guide shaft 2a.

At the joints between the mating links 5a and 5b of the two pairs, a table is biaxially pivotally rotatably supported through third couplings 16 (the detail will be described later).
[0007]

The drives 4 on each of the guide shafts 2a and 2b consist of a pair of parallel threaded shafts 8a and 8b provided, with a predetermined distance kept between them respectively on each of the first and second guide shafts 2a and 2b, and motors 9a and 9b installed at the ends of the threaded shafts 8a and 8b. The threaded shafts 8a and 8b are threadedly engaged with internally threaded members 10a and 10b respectively correspondingly, and the internally threaded members 10a and 10b can be moved on the threaded shafts 8a and 8b by the rotation of the threaded shafts 8a and 8b driven by the motors 9a and 9b. The internally threaded members 10a and 10b are integrally attached to the sides of the first and second sliding members 3a and 3b respectively correspondingly.

So, if the motor 9a is selected and actuated for example, to rotate the threaded shaft 8a only, the internally threaded member 10 threadedly engaged with it is moved along the threaded shaft 8a, to slide the first sliding member 3a only along the first guide shaft 2a (or the first guide shaft 2b).

On the other hand, if the motor 9b is selected and actuated to rotate the threaded shaft 8b, the internally threaded member 10b threadedly engaged with it is moved along the threaded shaft 8b, to slide the second sliding member 3b along the first guide shaft 2a (or the second guide shaft 2b).

Furthermore, if both the motors 9a and 9b are selected and actuated to rotate both the threaded shafts 8a and 8b, both the internally threaded members 10a and 10b threadedly engaged with them are moved along the threaded shafts 8a and 8b, to slide both the first and second sliding members 3a and 3b along the first guide shaft 2a (or the second guide shaft 2b).

As described above, in the drives 4, if the threaded shafts 8a and/or 8b to be rotated by the motors 9a and/or 9b is selected, either the first or second sliding member 3a or 3b only can be slid along the first guide shaft 2a (or the second guide shaft 2b), or both the first and second sliding members 3a and 3b can be simultaneously slid along the first guide shaft 2a (or the second guide shaft 2b). When both the first and second sliding members 3a and 3b are simultaneously slid along the first guide shaft 2a (or the second guide shaft 2b), the first and second sliding members 3a and 3b can be slid in the same direction or reverse directions at respectively set proper speeds for respectively set proper distances.

Moreover, the threaded progression directions on the threaded shafts 8a and 8b can be the same by adopting either right handed thread or left handed thread for both of them, or either the threaded shaft 8a or 8b can be of right handed thread, while the other can be of left handed thread. In any case, the progression directions of the first and second sliding members 3a and 3b can be controlled by the directions of the threaded shafts 8a and 8b rotated by the motors 9a and 9b.

[0008]

In the first and second couplings 6a and 6b, arbors 12a and 12b are rotatably installed in brackets 11a and 11b mounted on the first and second sliding members 3a and 3b, in such a way that the grooved heads 12h of the arbors 12a and 12b are protruded. The ends of the links 5a and 5b are rotatably fitted in the grooved heads 12h of the arbors 12a and 12b. Therefore, the respective links 5a and 5b can rotate around two axes orthogonal to each other, and so the first and second couplings 6a and 6b assure two in the degree of freedom while they connect the links 5a and 5b with the first and second sliding members 3a and 3b.

Furthermore, each of the second couplings 6b is provided with a rotation arrester 13 to prevent the rotation of the arbor 12b around itself. The rotation arrester 13 consists of a disc 14 installed at the end on the side opposite to the grooved head 12h, of the arbor 12b protruded from the bracket 11b, and a clamp 15 for grasping the disc 14 on both sides of the disc 14, to prevent the rotation of the disc 14, thereby preventing the rotation of the arbor 12b.

Figure 16:
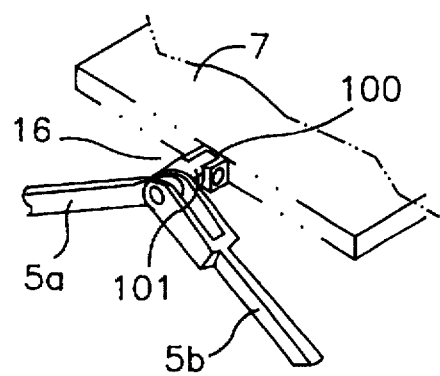
[FIG. 16] A perspective view for mainly illustrating the coupling of two in the degree.

Each of the third couplers 16 connecting the joints between the respectively mating links 5a and 5b to the table 7 can pivotally rotate in the direction along the first guide shaft 2a (or the second guide shaft 2b) and in the direction to cross the first guide shaft 2a (or the second guide shaft 2b). FIG. 16 shows an example of the third coupling 16 on the first guide shaft 2a, which consists of a grooved member 100 on the table 7 side and a link coupling member 101 pivotally rotatably fitted in the groove of the grooved member 100, and the link coupling member 101 is protruded transversely from the joint between the links 5a and 5b and can rotate around the the same axis as that of the pivot between the mating links 5a and 5b. That is, since the third coupling 16 can rotate around two axes orthogonal to each other, it assures two in the degree of freedom while it connects the joint between the links 5a and 5b with the table 7.

[0009]

Figure 3:
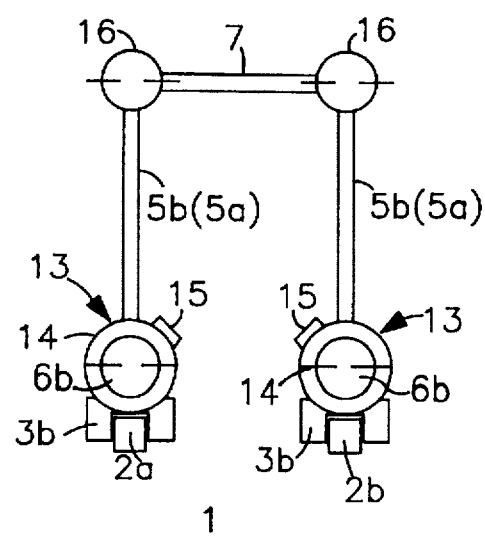
[FIG. 3] A typical side illustration showing the function of the couplings of the multi-degree-of-freedom positioning mechanism shown in FIG. 1.
Figure 4:
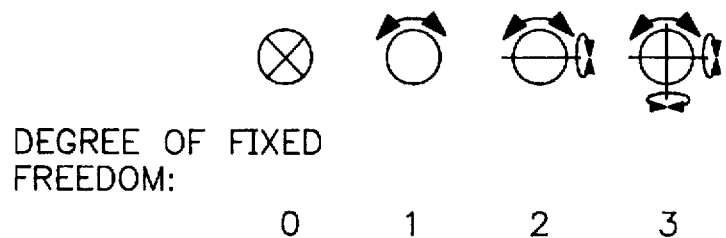
[FIG. 4] Symbolic illustrations showing the degrees of freedom of the couplings applied in the multi-degree-of-freedom positioning mechanism of the present invention.
Figure 5:
[FIG. 5] Symbolic illustrations showing the action states of the rotation arrester applied in the multi-degree-of-freedom positioning mechanism of the present invention.

FIG. 3 typically shows the first type of the multi-degree-of-freedom mechanism 1. As described above, since the first, second and third couplings 6a, 6b and 16 can rotate around two axes orthogonal to each other respectively, they assure two in the degree of freedom. This configuration is symbolized in FIG. 3. The rules of the respective symbols used also in the drawings referred to later are shown in FIGS. 4 and 5.

As shown in FIG. 3, the second couplings 6b at the second sliding members 3b on the first and second guide shafts 2a and 2b are provided with the rotation arresters 13. So, the symbols as illustrated are used. In each of the rotation arresters 13, the clamp 16 is actuated to grasp the disc 14, for preventing the rotation of the arbor 12b around itself and the rotation-arrested state is expressed by smearing out the symbol of the clamp 15 as shown in FIG. 5. On the other hand, when the rotation arrester 13 is not actuated, the arbor 12b is in a rotatable state which is expressed by keeping the symbol of the clamp 15 open.

[0010]

In the above configuration, if the motors 9a and 9b as components of the drives 4 are started and controlled selectively, considering the respective rotation angles and directions, to rotate either or both of the respective threaded shafts 8a and 8b, the respective first and/or second sliding members 3a and/or 3b are slid, as intended, together with the respective internally threaded members 10a and/or 10b on the first and/or second guide shafts 2a and/or 2b, to change the respective relative positional relations between the first and second sliding members 3a and 3b, and their absolute locations on the first and/or second guide shafts 2a and/or 2b Such actions of the first and second sliding members 3a and 3b can displace the ends of the respective links 5a and 5b through the respective first and second couplings 6a and 6b, as intended, in the direction along the first and second guide shafts 2a and 2b and in the direction to cross the first and second guide shafts 2a and 2b. These displaced links 5a and 5b displace the table 7 connected through the third couplings 16 at the joints between the respectively mating links 5a and 5b, as intended, in the direction along the first and second guide shafts 2a and 2b and in the direction to cross the first and second guide shafts 2a and 2b. Thus, multi-degree-of-freedom positioning can be executed.

[0011]

The action example of the first type of the multi-degree-of-freedom positioning mechanism described above is described below in more detail.

At first, the drives 4 are controlled to slide the respective first and second sliding members 3a and 3b, while the respective relative positions between the respective first and second sliding members 3a and 3b on the first and second guide shafts 2a and 2b are kept constant.

This control can be effected by controlling the two pairs of the motors 9a and 9b on the first and second guide shafts 2a and 2b, to turn the two pairs of threaded shafts 8a and 8b, i.e., all the threaded shafts 8a and 8b by the same number of revolutions. Needless to say, the respective motors 9a and 9b are rotated in the directions to make the respective threaded shafts 8a and 8b progress in the same direction.

If the respective first and second sliding members 3a and 3b are slid on the first and second guide shafts 2a and 2b, while the respective relative positions between the first and second sliding members 3a and 3b are kept constant, the third couplings 16 located at the joints between the respectively mating links 5a and 5b are moved along the first and second guide shafts 2a and 2b, while the heights of the third couplings 16 are kept constant. Therefore, the table 7 is displaced in the axial direction (X direction in FIG. 1) of the first and second guide shafts 2a and 2b, while the initial attitude and supported height of the table 7 are kept constant.

In another case, the drives 4 are controlled to slide the respective first and second sliding members 3a and 3b on both the first and second guide shafts 2a and 2b at the same speed for the same distance along the first and second guide shafts 2a and 2b, in such a way that the respective first and second members 3a and 3b may become closer to each other or farther away from each other.

In this case, the third couplings 16 located at the joints between the respectively mating links 5a and 5b are moved vertically only, without being moved along the first and second guide shafts 2a and 2b.

That is, if the respective first and second sliding members 3a and 3b are slid to become closer to each other at the same speed, the angles formed by the respectively mating links 5a and 5b at their joints become gradually smaller, to gradually raise the positions of the joints. On the other hand, if the respective first and second sliding members 3a and 3b are slid to become farther away from each other at the same speed, the angles formed by the respectively mating links 5a and 5b at their joints become gradually larger, to gradually lower the positions of the joints.

Therefore, this control action causes the table 7 to be raised or lowered vertically (Y direction in FIG. 1), i.e., adjusted in height, while its supported state is kept constant.
[0012]

In a further other case, in the state of FIG. 3, the rotation arrester 13 of the second coupling 6b at the second sliding member 3b on the second guide shaft 2b is actuated to let the clamp 15 grasp the disc 14 for preventing the rotation of the arbor 12 around itself, and in this state, the drives 4 are started to slide the first and second sliding members 3a and 3b on the first guide shaft 2b only, in such a way that the first and second sliding members 3a and 3b may become farther away from each other. In this case, only the third coupling 16 connected with the links 5a and 5b on the first guide shaft 2a descends, while the third coupling 16 connected with links 5a and 5b on the second guide shaft 2b keeps its height. As described above, since the arbor 12b supporting the mating links 5a and 5b on the second guide shaft 2b is prevented from being rotated around itself, the third coupling 16 at the joint between these mating links 5a and 5b is kept stationary at its height and at its location on the second guide shaft 2b.

Therefore, the table 7 is pivotally rotated to gradually descend with the third coupling 16 at the joint between the mating links 5a and 5b on the second guide shaft 2b as a pivot, as the third coupling 16 connected with the links 5a and 5b on the first guide shaft 2a descends. That is, since the arbor 12b supporting the links 5a and 5b on the first guide shaft 2a is not prevented from being rotated around itself, the links 5a and 5b on the first guide shaft 2a are pivotally rotated around the axis of the arbor 12b installed along the first guide shaft 2a, i.e., rotated in the direction to cross the first guide shaft 2a. In this action, the table 7 can be lowered and inclined to an angle equal to the inclination angle of the links 5a and 5b. This state is shown in FIG. 6.
[0013]

In the state of FIG. 6, if the drives 4 are started to slide the first and second sliding members 3a and 3b on the first guide shaft 2a only at the same speed, in such a way that the first and second sliding members 3a and 3b may become closer to each other, the third coupling 16 connected with the links 5a and 5b on the first guide shaft 2a ascends. So, the table 7 is displaced in reverse to the above mentioned action, to return to the state of FIG. 3.

If the same action is continued further still after the table 7 has returned to the state of FIG. 3, the table 7 is rotated to gradually ascend, with the third coupling 16 at the joint between the mating links 5a and 5b on the second guide shaft 2b as a pivot, as the third coupling 16 connected with the links 5a and 5b on the first guide shaft 2a ascends.

In the above action, the arbor 12b for the second sliding member 3b on the second guide shaft 2b is prevented from being rotated around itself. It is evident that even if only the rotation arrester 13 of the second coupling 6b at the second sliding member 3b on the first guide shaft 2a is actuated to let the clamp 15 grasp the disc 14 for preventing the rotation of the arbor 12b around itself, the same actions as described above can occur. In this case, the third coupling 16 connected with the links 5a and 5b on the first guide shaft 2a acts as the pivot of the table 7.

In the first type of the multi-degree-of-freedom positioning mechanism, the following action can be effected in addition to the basic actions described above.

In the state of FIG. 6, the rotation arrester 13 of the second coupling 6b at the second sliding member 3b on the first guide shaft 2a is actuated to let the clamp 15 grasp the disc 14, for arresting the rotation of the arbor 12b around itself, while the rotation arrester 13 of the second coupling 6b at the second sliding member 3b an the second guide shaft 2b side is released from its actuated state, to allow the arbor 12b to be rotated around itself.

Figure 7:
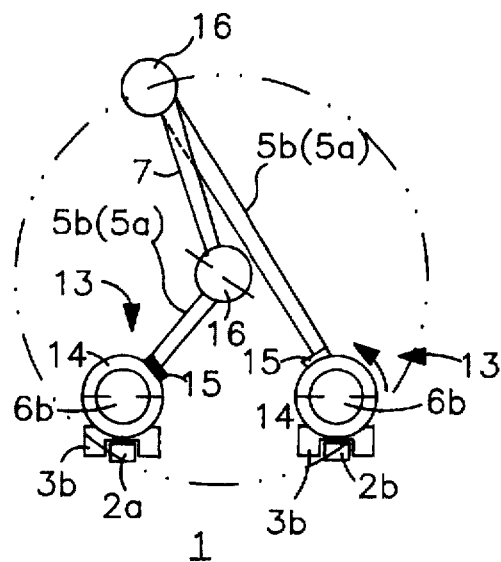
[FIG. 7] A typical side illustration showing an action of the multi-degree-of-freedom positioning mechanism shown in FIG. 1.

In this state, if the drives 4 are started to slide the first and second sliding members 3a and 3b on the second guide shaft 2b at the same speed in an action similar to the above, in such a way that the first and second sliding members 3a and 3b may become closer to each other, the third coupling 16 connected with the links 5a and 5b on the second guide shaft 2b ascends. So, the table 7 is pivotally rotated to ascend and to be steep in inclination, with the third coupling 16 at the joint between the mating links 5a and 5b on the first guide shaft 2a as a pivot. Finally, the table 7 exceeds an inclination angle of 90 degrees, to the extreme end of a proper stroke where the parts threaten to interfere with each other, as shown in FIG. 7.

Figure 8:
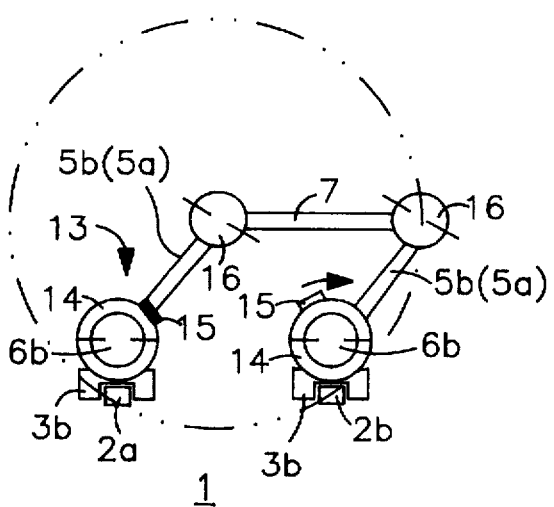
[FIG. 8] A typical side illustration showing an action of the multi-degree-of-freedom positioning mechanism shown in FIG. 1.

On the other hand, in the state of 6, the rotation arrester 13 of the second coupling 6b at the second sliding member 3b on the first guide shaft 2a is actuated to let the clamp 15 grasp the disc 14, for arresting the rotation of the arbor 12b around itself, and the rotation arrester 13 of the second coupling 6b at the second sliding member 3b on the second guide shaft 2b side is released from its actuated state, to allow the arbor 12b to be rotated around itself. In this state, if the drives 4 are started to slide the first and second sliding members 3a and 3b on the second guide shaft 2b at the same speed in an action similar to the above, in such a way that the first and second sliding members 3a and 3b may become farther away from each other, the third coupling 16 connected with the links 5a and 5b on the second guide shaft 2b descends. So, the table 7 is pivotally rotated to descend and to be gentle in inclination, with the third coupling 16 at the joint between the mating links 5a and 5b an the first guide shaft 2a as a pivot. Thus, the table 7 becomes horizontal again as shown in FIG. 8. However, It is to be noted that even though the table 7 is horizontal, it is lower in height compared with the state of FIG. 3, and is displaced in the direction to cross the first and second guide shafts 2a and 2b.

The above action can be effected even if the second sliding member 3b with the arbor 12b prevented from being rotated is on the second guide shaft 2b side.

[0014]

Figure 9:
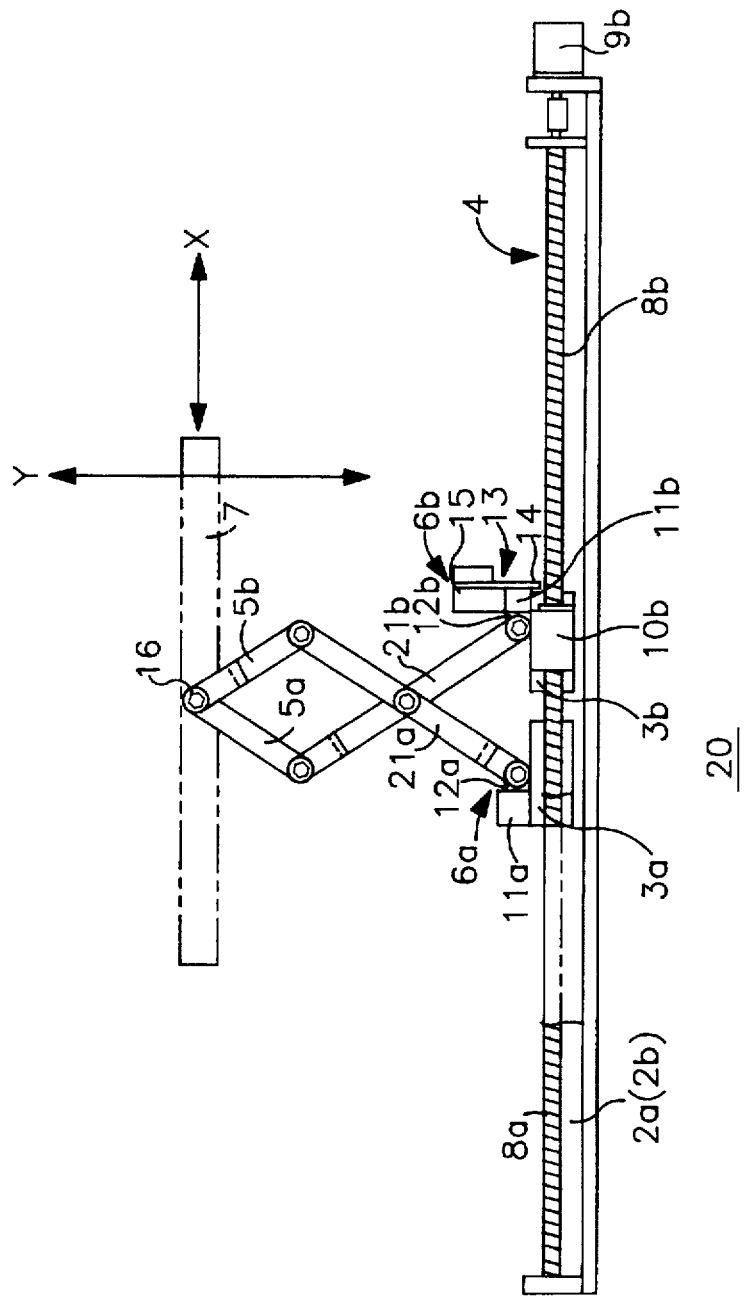
[FIG. 9] A typical side illustration showing the multi-degree-of-freedom positioning mechanism of the present invention as another example.

FIG. 9 shows the basic configuration of an example embodying the second type of the multi-degree-of-freedom positioning mechanism 1 of the present invention. The second type has substantially the same components as those of the first type except that only the components corresponding to the links 5a and 5b are different. The same components in the second type are given the same symbols as those in the drawings referred to in the above description, to avoid double description.

In the multi-degree-of-freedom positioning mechanism 20 of the second type, the respective first and second sliding members 3a and 3b slidably mounted on the first and second guide shafts 2a and 2b are engaged, with the ends, on one side, of one each pair of equally long links 21a and 21b mutually pivotally rotatably connected in cross at their intermediate points, through the respective first and second couplings 6a and 6b, and the ends, on the other side, of the respective pairs of links 21a and 22b are engaged with the ends of a respectively corresponding pair of foldably joined equally long links 5a and 5b as used in the first type, mutually pivotally rotatably. Furthermore, through the biaxially rotatable third couplings at the joints between the respectively mating links 5a and 5b, the table 7 is supported. To express briefly, the second type uses pantograph type links instead of the foldably joined links 5a and 5b formed like isosceles triangles. In this example, a pantograph consists of respectively mating links 5a and 5b and links 21a and 21b.

In the second type, the selectively controllable drives 4 are provided for the respective first and second sliding members 3a and 3b, and the rotation arresters 13 are provided for the second couplings 6b at the second sliding members 3b on the first and second guide shafts 2a and 2b.

[0015]

The multi-degree-of-freedom mechanism 20 of the second type can perform all the actions of the first type described above. In addition, the pantograph type links can elongate the strokes in their movement in the direction orthogonal to the direction in which the first and second sliding members 3a and 3b are slid to become closer to each other or farther away from each other, compared to the isosceles triangular links of the first type. Therefore, in the second type compared with the first type, the table 7 can be displaced in a wider range and can be applied to a wider range of applications.

As can be seen from the above actions, in the multi-degree-of-freedom positioning mechanisms of the first and second types, the position and attitude of the table 7 can be known in reference to the locations of the respective first and second sliding members 3a and 3b of the first and second guide shafts 2a and 2b. So, if the drives 4 are actuated while detecting the locations of the respective first and second sliding members 3a and 3b, the table 7 can be set in a desired position and attitude.

It is to be noted here that the description of the multi-degree-of-freedom mechanisms 1 and 20 of the first and second types based on FIGS. 1 through 9 does not refer to any means for preventing the rotation of the table 7 around the axis of the third couplings 16, i.e., as described above, around the axis in the direction to cross the first and second guide shafts 2a and 2b. In FIGS. 1 through 9, for the convenience to clearly describe the essential actions of the multi-degree-of-freedom mechanisms 1 and 20 of the first and second types, the table 7 is supported by one each of the third couplings 16 on each of both the linearly arranged sides, and no means for preventing the pivotal rotation of the table 7 caused by any load on the table 7 is illustrated.

Figure 17:
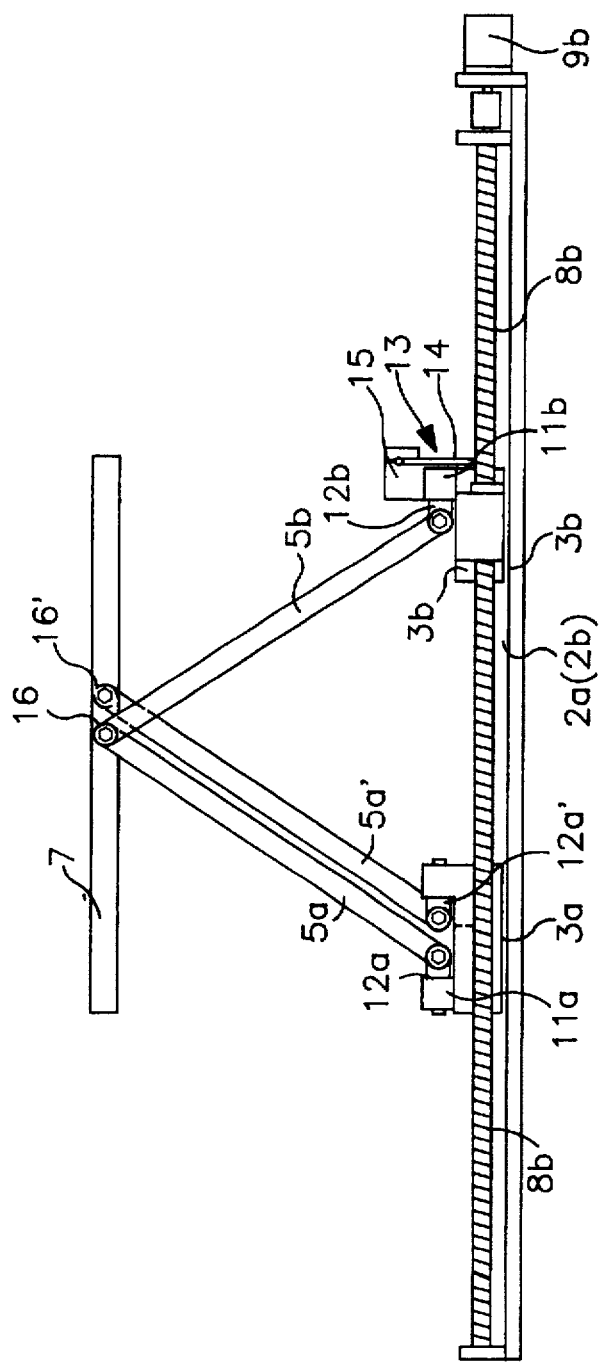
[FIG. 17] A side view showing an example of the pivotal rotation preventing means in the mechanism of the first type.

An example of the pivotal rotation preventing means is described below. FIG. 17 shows an example of the pivotal rotation preventing means for the multi-degree-of-freedom positioning mechanism 1 of the first type. In this means, an arbor 12a' is additionally installed on the first sliding member 3a, and a third coupling 16' is also additionally installed for the table 7. And between the additionally installed arbor 12a' and third coupling 16', another link 5a' is connected along the link 5a to form a parallel link mechanism. It is evident that this configuration can prevent the pivotal rotation of the table 7 around the axis of the third coupling 16, i.e., around the axis perpendicular to the paper surface.

Figure 18:
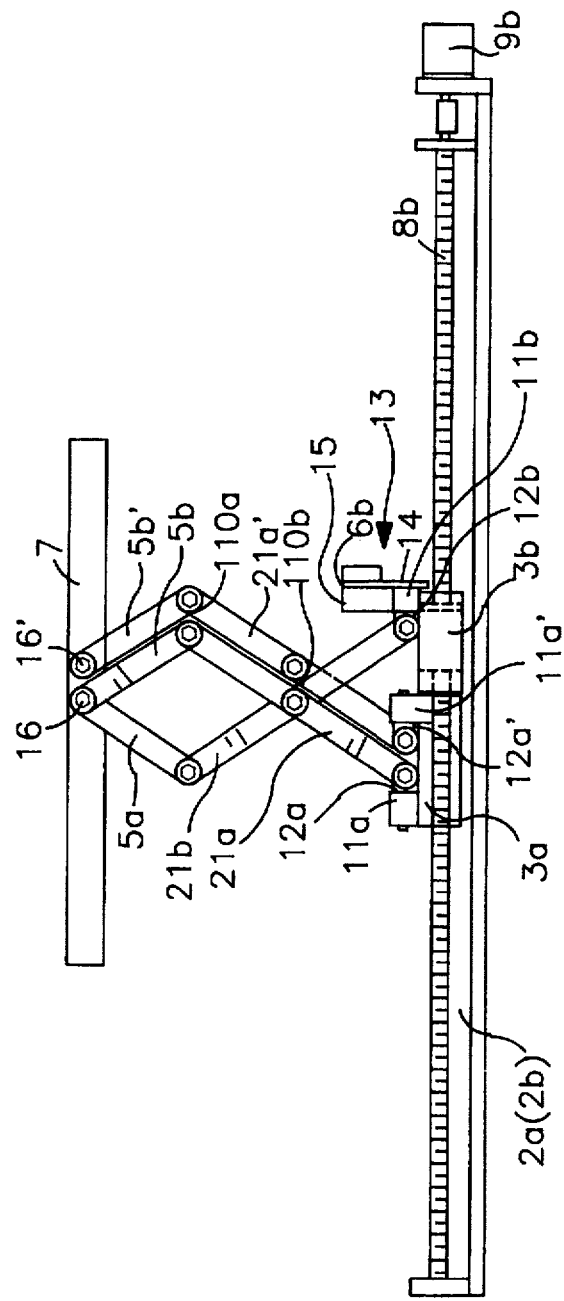
[FIG. 18] A side view showing an example of the pivotal rotation preventing means in the mechanism of the second type.

FIG. 18 shows an example of the pivotal rotation preventing means for the multi-degree-of-freedom positioning mechanism 20 of the second type. In this means, as in the means for the first type described above, an arbor 12a' is additionally installed on the first sliding member 3a, and a third coupling 16' is additionally installed for the table 7. And links 5b' and 21a' respectively parallel to the links 5b and 21a are connected between the head of the arbor 12a' and the third coupling 16', and holding links 110a and 110b are connected between the joint between the links 5b and 21a and the joint between the links 5b' and 21a', and between the crossed point of the links 21a and 21b connected in cross and the intermediate point of the link 21a'. It is also evident that this configuration can prevent the pivotal rotation of the table 7 around the axis of the third coupling 16, i.e., around the axis perpendicular to the paper surface, by analogy with the pivotal rotation preventing means for the first type described above.

Though not illustrated, even if the support point of the table 7 by either of the third couplings 16, i.e., the location of the axis as the pivot of the rotation to be prevented on either of the first and second guide shafts 2a and 2b is changed in relation with that on the other guide shaft 2a or 2b, the pivotal rotation of the table 7 can be prevented. Dislocating either of the points where the third couplings 16 are installed to the table 7 can also be used as the pivotal rotation means.

When such a pivotal rotation preventing means is used, not only the third couplings 16 of two in the degree of freedom but also the third couplings 16 of three in the degree of freedom described later can be used.

[0016]

FIGS. 10 through 13 show the basic configuration of an example embodying the multi-degree-of-freedom positioning mechanism 30 of the third type.

The multi-degree-of-freedom positioning mechanism 30 has the first and second guide shafts 2a and 2b arranged in parallel to each other, and components connected with them, as in the first type described before. So, the same components as those used in the first type are given the same symbols, to avoid double description. The third type is different from the first type, in that sixth couplings 33 of three in the degree of freedom are used instead of the third couplings 16 of two in the degree of freedom, and that the sixth couplings 33 on the first and second guide grooves 2a and 2b are installed near an edge of the table 7. The increment in the degree of freedom of the couplings of three in the degree of freedom allows the pivotal rotation of the table 7 in the horizontal direction.

Figure 19:
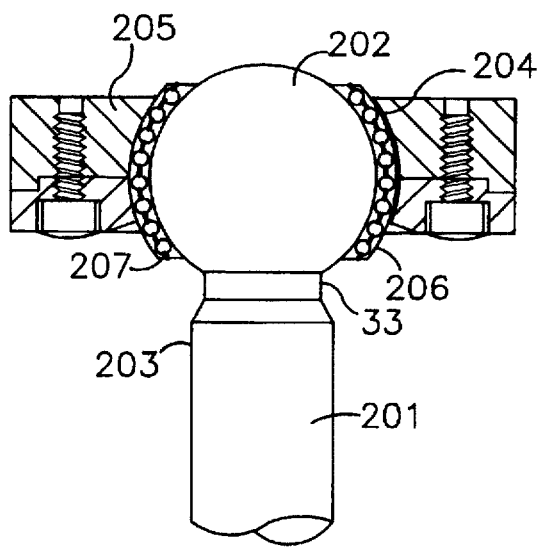
[FIG. 19] A sectional view showing an example of the coupling of three in the degree of freedom.
Figure 20:
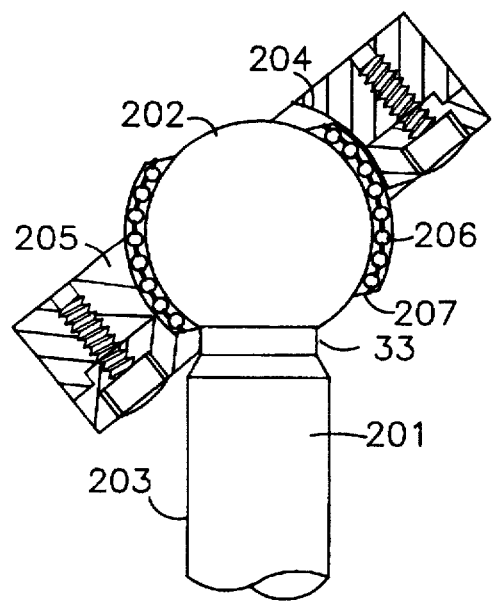
[FIG. 20] A sectional view showing an example of the coupling of three in the degree of freedom, after some motion from the state of FIG. 18.
[0007]

FIGS. 19 and 20 show an example of the sixth coupling 33 of three in the degree of freedom.

The sixth coupling 33 consists of a first member 203 with a spherical body 202 provided at the tip of a rod 201, a second member 205 with a spherical concave 204 larger than the outer diameter of the spherical body 202, and a third member 207 holding many balls 206 to fill the clearance formed when the spherical body 202 of the first member 203 is fitted in the spherical concave 204 of the second member 205. In this configuration, the first member 203 and the second member 205 can rotate around three axes orthogonal to each other. For example, the rod 201 of the first member 203 is used as the axis at the joint between the mating links 5a and 5b, and the second member 205 is fixed to the table 7 (or vice versa), to constitute the coupling 33 of three in the degree of freedom.

Now back to the description of the entire configuration of the third type, in addition to the above mentioned first and second guide shafts 2a and 2b, a third guide shaft 31 is provided to be orthogonal to them. On the third guide shaft 31, fourth and fifth sliding members 31a and 31b are slidably installed.

These fourth and fifth sliding members 31a and 31b can be respectively independently slid, or slid simultaneously in the same direction for the same distance, or slid simultaneously in different directions to be closer to each other or to be farther away from each other for the same distance along the third guide shaft 31, like the first and second sliding members 3a and 3b, by the selective control action of drives similar to the drives 4 of the first and second types, though the drives for the fourth and fifth sliding members 31a and 31b are not illustrated.

On the fourth and fifth sliding members 31a and 31b, a pair of foldably joined equally long links 5a and 5b are installed through the fourth and fifth couplings 32a and 32b of two in the degree of freedom, like the links 5a and 5b installed through the first and second couplings 6a and 6b on the first and second sliding members 3a and 3b. At the joint between these mating links 5a and 5b, the table 7 is supported through the sixth couplings 33 of three in the degree of freedom, as configured for the first and second sliding members 3a and 3b. The point where the sixth coupling 33 on the third guide shaft 31 is connected with the table 7 is at the edge opposite to the edge, near which the sixth couplings 33 on the first and second guide shafts 2a and 2b support the table 7. Thus, a three-point support structure is formed, and the pivotal rotation axes around which the table 7 can be vertically pivotally rotated by these sixth couplings 33 are orthogonal to each other.

[0017]

According to the third type, since the table 7 can be pivotally rotated around the three axes orthogonal to each other respectively at the points where the table 7 is connected with the sixth couplings 33, the following actions can be effected in addition to the actions described above for the first and second types.

Figure 10:
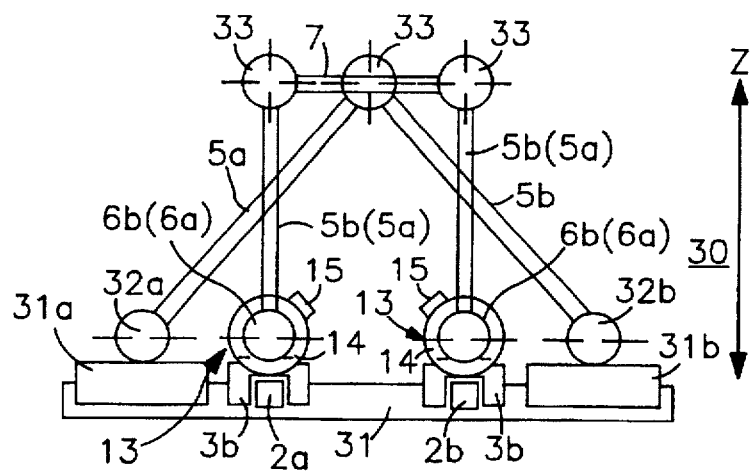
[FIG. 10] A typical side illustration for explaining the function of the multi-degree-of-freedom positioning mechanism shown in FIG. 9.
Figure 11:
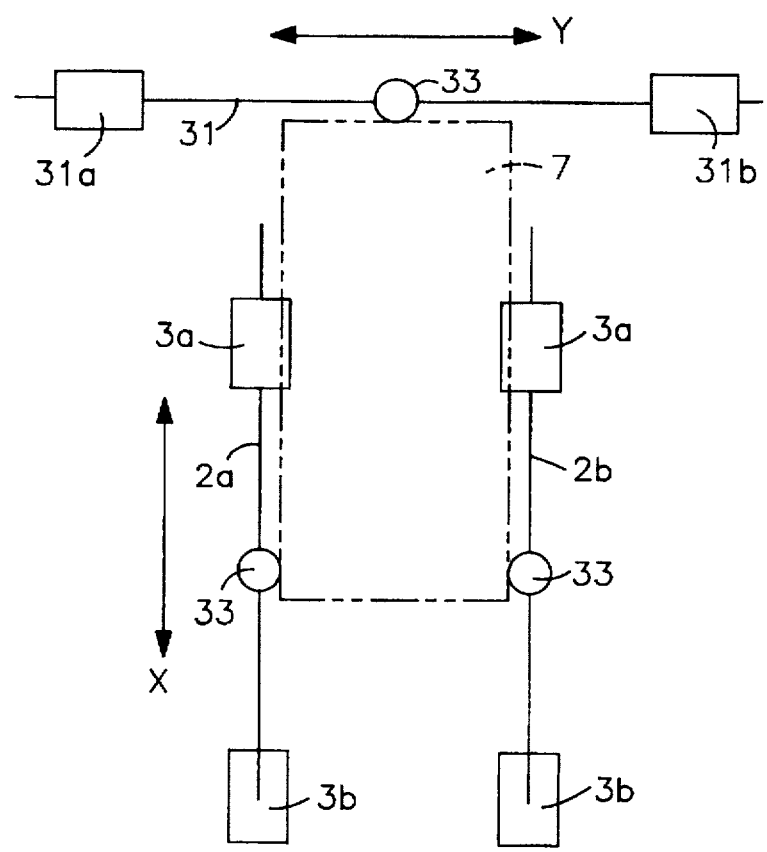
[FIG. 11] A typical plan illustration of the multi-degree-of-freedom positioning mechanism shown in FIG. 10.

At first, in a state where the table 7 is supported horizontally as shown in FIG. 10, if the fourth and fifth sliding members 31a and 31b only are controlled to lower the sixth coupling 33 on the third guide shaft 31, the table 7 is pivotally rotated to descend and incline with the axis across the pair of sixth couplings 33 on the first and second guide shafts 2a and 2b as a pivot. On the contrary, if the sixth coupling 33 on the third guide shaft 31 is raised, the table 7 is pivotally rotated to ascend and incline with the axis across the pair of sixth couplings 33 on the first and second guide shafts 2a and 2b as a pivot. In these actions, the links 5a and 5b on the third guide shaft 31 are pivotally rotated around a virtual axis in parallel to the guide shaft 31.

Contrary to the above, in a state where the table 7 is supported horizontally, even if the respective first and second sliding members 3a and 3b of the first and second guide shafts 2a and 2b are controlled to raise or lower their sixth couplings 33 while the fourth and fifth sliding members 31a and 31b are kept at their locations, the table can be inclined in the same directions as stated above.

The mechanism of the third type can perform not only these actions, but also actions caused by combining the actions of the first type and the above mentioned actions effected by the components on the third guide shaft 3.

Figure 12:
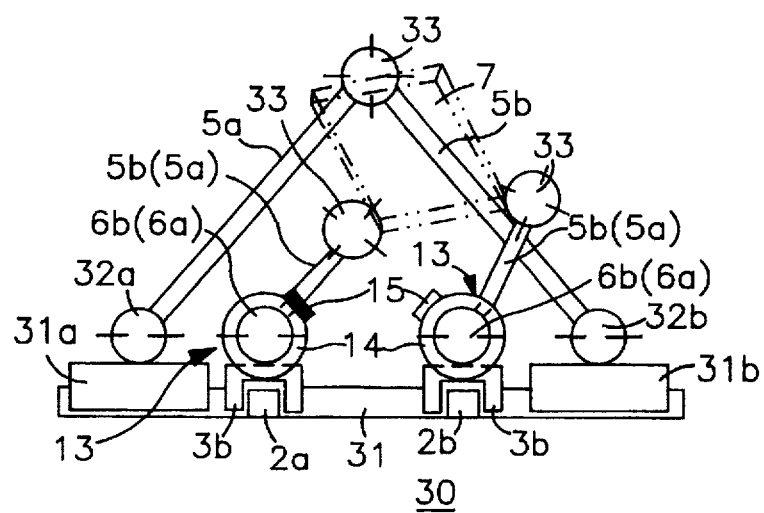
[FIG. 12] A typical side illustration for explaining the actions of the multi-degree-of-freedom positioning mechanism shown in FIG. 10.

For example, if the distance between the first and second sliding member 3a and 3b on the first guide shaft 2a is elongated while the fourth and fifth sliding members 31a and 31b on the third guide shaft 31 are fixed, the sixth coupling 33 between the table 7 and the joint between the mating links 5a and 5b on the first guide shaft 2a descends, displacing the table 7 with the position of the sixth coupling 33 as the lowest point. In this case, if the rotation arrester 13 of the second coupling 6b at the second sliding member 3b on the first guide shaft 2a is actuated to arrest the rotation of the arbor 12b around itself, and the first and second sliding members 3a and 3b on the second guide shaft 2b are slid, then the sixth coupling 33 between the table 7 and the joint between the mating links 5a and 5b on the second guide shaft 2b also descends, tilting the table 7 in such a way that the edge of the table 7 near the sixth couplings 33 between the table 7 and the joints between the respective mating links 5a and 5b on the first and second guide shafts 2a and 2b becomes the lowest position, as shown in FIG. 12.

As described above, the table 7 is supported at three points; on both sides at one edge of the table 7 by the sixth couplings 33 at the joints between the respective mating links 5a and 5b engaged with the respective first and second sliding members 3a and 3b on the first and second guide shafts 2a and 2b, and at the center at the other edge of the table 7 by the sixth coupling 33 at the joint between the mating links 5a and 5b engaged with the fourth and fifth sliding members 31a and 31b on the third guide shaft 31. So, the table 7 can be displaced delicately by properly sliding the respective first and second sliding members 3a and 3b and the fourth and fifth sliding members 31a and 31b.

Since the locations of the sixth couplings 33 at which the table 7 is supported can be obtained in reference to the locations of the respective first and second sliding members 3a and 3b of the first and second guide shafts 2a and 2b and of the fourth and fifth sliding members 31a and 31b on the third guide shaft 31. So, if the drives are actuated while detecting the locations of the respective first and second sliding members 3a and 3b and the fourth and fifth sliding members 31a and 31b, the table 7 can be set in a desired position and attitude.

As described above, in the multi-degree-of-freedom positioning mechanism 30 of the third type, the table 7 can be displaced in the longitudinal (X) direction, transverse (Y) direction, and vertical (Z) direction, and furthermore can be rotated around the Z axis in the drawing. Furthermore, the table 7 in the horizontal state (XY plane) can be tilted in the longitudinal (X) direction and in the transverse (Y) direction. Thus, the table is six in the degree of freedom to allow control in position and attitude.

[0018]

Figure 13:
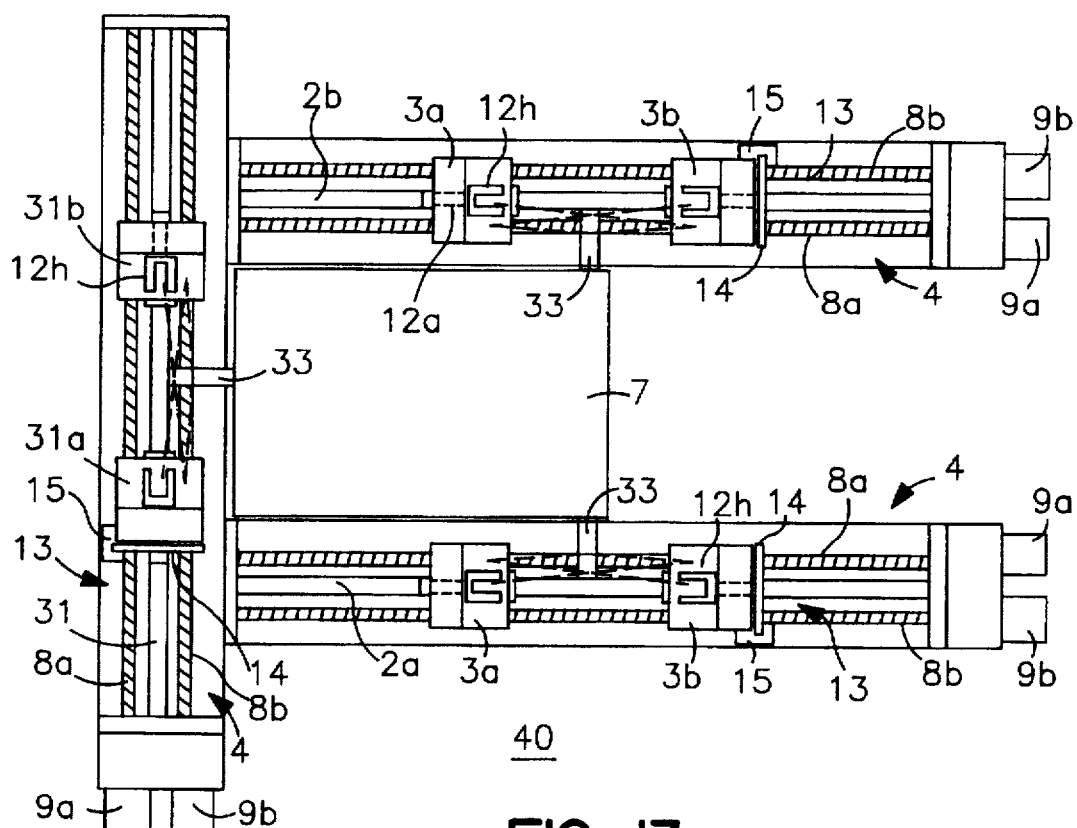
[FIG. 13] A typical side illustration showing the multi-degree-of-freedom positioning mechanism of the present invention as a further other example.
Figure 14:
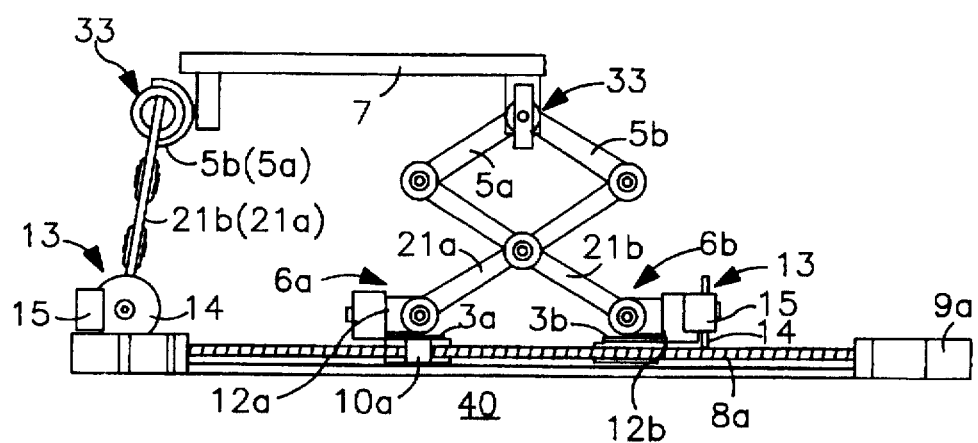
[FIG. 14] A typical side illustration of the multi-degree-of-freedom positioning mechanism shown in FIG. 13.
Figure 15:
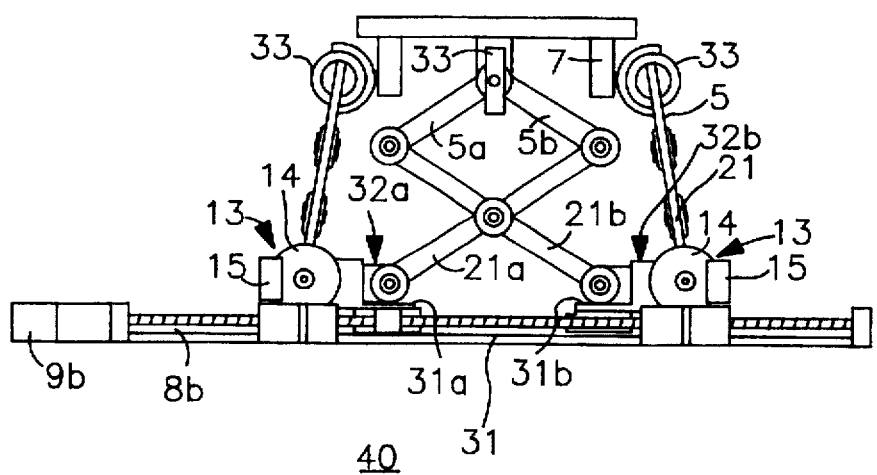
[FIG. 15] Another typical side illustration of the multi-degree-of-freedom positioning mechanism shown in FIG. 13.

FIGS. 13 through 15 show the basic configuration of an example embodying the fourth type of the multi-degree-of-freedom positioning mechanism 1 of the present invention. The relation of the fourth type to the third type corresponds to the relation of the second type to the first type, and the fourth type is different from the third type in the components corresponding to the links 5a and 5b of the third type. Since the other components are substantially the same, those components are given the same symbols as those used for the third type described above, to avoid double description.

The multi-degree-of-freedom positioning mechanism 40 of the fourth type uses so-called pantograph type links as in the second type, instead of the foldably joined links 5a and 5b formed like isosceles triangles used in the third type. Also in this case, a pantograph consists of the respectively mating links 5a and 5b and links 21a and 21b.

FIGS. 13 through 15 for the mechanism 40 of the fourth type show drives 4 similar to those described for the first and second types.

[0019]

The multi-degree-of-freedom positioning mechanism 40 of the fourth type as described above can perform all the actions of the third type described before. In addition, as described for the mechanism of the second type, the pantograph type links can elongate the strokes in their movement in the direction orthogonal to the direction in which the first and second sliding members 3a and 3b and the fourth and fifth sliding members 31a and 31b are slid to become closer to each other or farther away from each other. Therefore, in the fourth type compared with the third type, the table 7 can be displaced in a wider range and can be applied to a wider range of applications.

[0020]

[EFFECTS OF THE INVENTION]

As described above, the table can be displaced in multi-degree of freedom, and the position and attitude of the table can be decided by the locations of the sliding members on the guide shafts. That is, since the present invention allows the position and attitude of the table to be easily derived from the positions of sliding members on guide shafts, the attitude control is easy. Furthermore, the mechanism is simple, and the range of table displacement can be expanded to cater for a wider range of applications.

I claim:

1. A multi-degree-of-freedom positioning mechanism, comprising first and second guide shafts and first and second moving members movably mounted on each of the first and second guide shafts; one each drive, being connected with the respective first and second moving members, to allow said respective first and second moving members to travel on said first and second guide shafts individually; two pairs of foldably joined equally long links having mating links and two ends, said ends being pivotally rotatable engaged with the respective first and second moving members through respective first and second couplings; two joints, each of said joints connected to a pair of mating links of said foldably joined equally long links; and two opposite edges of a table, being pivotally rotatable engaged with the two joints between the mating links of respective pairs of joints to displaceably support the table, each of the second couplings being provided with a rotation arrester in which an arbor having two ends is rotatably mounted in a bracket provided on the second moving member, with both ends of the arbor protruding from the bracket, and said arbor having one end rotatably engaged with one end of the link, to prevent the rotation of the arbor around itself.

2. A multi-degree-of-freedom positioning mechanism, comprising first and second guide shafts and first and second moving members movably mounted on each of the first and second guide shafts; one each drive, being connected with the respective first and second moving members, to allow the respective first and second moving members to travel on the first and second guide shafts individually; two pairs of equally long links having ends and connected to foldably joined equally long mating links; the ends, on one side, of two pairs of equally long links mutually pivotally rotatably connected in cross at their intermediate points, being engaged with the respective first and second moving members through respective first and second couplings; the ends, on the other side, of said two pairs of links, being pivotally rotatably engaged with the ends of a respectively corresponding pair of foldably joined equally long mating links; and two opposite edges of a table, being pivotally rotatably engaged with two joints between mating links of respective pairs, to displaceably support the table.

3. A multi-degree-of-freedom mechanism, comprising first and second guide shafts and first and second moving members movably mounted on each of the first and second guide shafts; one each drive, being connected with the respective first and second moving members, to allow the respective first and second moving members to travel on the first and second guide shafts individually; two pairs of equally long links having mating links and ends, the ends, on one side, of two pairs of equally long links mutually pivotally rotatable connected in cross at their intermediate points, being engaged with the respective first and second moving members through respective first and second couplings; the ends, on the other side, of said two pairs of links, being pivotally rotatable engaged with the ends of a respectively corresponding pair of foldably joined equally long mating links; and two opposite edges of a table, being pivotally rotatable engaged with two joints between mating links of the respective pairs, to displaceably support the table, each of the second couplings being provided with a rotation arrester in which an arbor having two ends is rotatably mounted in a bracket provided on the second moving member, with both ends of the arbor protruding from the bracket, and having one end of said arbor rotatably engaged with one end of an equally long link, to prevent rotation of the arbor around itself.

4. A multi-degree-of-freedom mechanism, comprising first, second and third guide shafts and first and second moving members movably mounted on each of the first, second and third guide shafts; one each drive, being connected with the respective first and second moving members, to allow the respective first and second moving members to travel on the first, second and third guide shafts individually; three pairs of foldably joined equally long links each having mating links and ends, the ends of three pairs of foldably joined equally long links, being pivotally rotatably engaged with the respective first and second moving members, through respective first and second couplings; said mating links of each of said three pair of said foldably joined equally long links being connected at opposite ends to joints; and three edges of a table, being pivotally rotatably engaged with three joints between the mating links of the respective pairs, to displaceably support the table.

5. A multi-degree-of-freedom mechanism, according to claim 4, wherein each of the second couplings is provided with a rotation arrester in which an arbor having two ends is rotatably mounted in a bracket provided on the second moving member, with both ends of the arbor protruding from the bracket, and having one end of said arbor rotatably engaged with an end of a foldably joined equally long link, to prevent the rotation of the arbor around itself.

6. A multi-degree-of-freedom mechanism, comprising first, second and third guide shafts and first and second moving members movably mounted on each of the first, second and third guide shafts; one each drive, being connected with the respective first and second moving members, to allow the respective first and second moving members to travel on the first, second and third guide shafts individually; three pairs of equally long links having ends and mating links; the ends, on one side, of three pairs of equally long links mutually pivotally rotatably connected in cross at their intermediate points, being engaged with the respective first and second moving members through respective first and second couplings; the ends, on the other side, of said three pairs of links, being pivotally rotatably engaged with the ends of a respectively corresponding pair of foldably joined equally long mating links; each of three pairs of mating links being connected to a joint; and each of three edges of a table, being pivotally rotatably engaged with one of said joints between the mating links of the respective pairs, to displaceably support the table.

7. A multi-degree-of-freedom mechanism, according to claim 6, wherein each of the second couplings is provided with a rotation arrester in which an arbor having two ends is rotatably mounted in a bracket provided on the second moving member, with both ends of the arbor protruding from the bracket, and having one end of said arbor rotatably engaged with an end of an equally long link, to prevent the rotation of the arbor around itself.

* * * * *